(12) United States Patent
Lee et al.

(10) Patent No.: US 7,180,634 B2
(45) Date of Patent: Feb. 20, 2007

(54) COLOR QUANTIZATION AND METHOD THEREOF AND SEARCHING METHOD USING THE SAME

(75) Inventors: Jin Soo Lee, Seoul (KR); Heon Jun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/390,309

(22) Filed: Mar. 28, 2006

(65) Prior Publication Data

US 2006/0164664 A1    Jul. 27, 2006

Related U.S. Application Data

(63) Continuation of application No. 10/994,402, filed on Nov. 23, 2004, which is a continuation of application No. 09/865,459, filed on May 29, 2001, now Pat. No. 6,919,971.

(30) Foreign Application Priority Data

May 26, 2000  (KR)  ............................... 2000-28759
Oct. 26, 2000  (KR)  ............................... 2000-63163

(51) Int. Cl.
  G06K 9/64   (2006.01)
  G06T 7/40   (2006.01)
  H04N 1/64   (2006.01)
  G06F 17/30  (2006.01)
(52) U.S. Cl. ...................... 358/1.9; 358/2.1; 358/3.23
(58) Field of Classification Search ............... 358/1.9, 358/2.1, 3.23, 500, 518, 520, 522, 530; 382/162, 382/168, 251, 274
See application file for complete search history.

(56) References Cited

U.S. PATENT DOCUMENTS 6,310,969 B1    10/2001    Kim et al.

(Continued)

FOREIGN PATENT DOCUMENTS

EP    0961489    1/1999

(Continued)

OTHER PUBLICATIONS

Heon Jun Kim et al: "Result on CT1: 1-3 HMMD Color Space and Histogram Quantization", ISO/IEC JTC1/SC29/WG11 MPEG99/M5004, Oct. 1999, Melbourne, Australia.

(Continued)

Primary Examiner—Jerome Grant, II
(74) Attorney, Agent, or Firm—Fleshner & Kim, LLP

(57) ABSTRACT

A color quantization method based on an HMMD color space and a multimedia searching method using the same in extracting color features for searching multimedia, to enable searching of multimedia data which has been quantized on different levels. A quantization method is optimized to be proper for various quantization levels so as to increase search performance in an HMMD color space. And the interoperability between color features quantized into different quantization levels is provided so as to search multimedia generated from different application programs and in which a quantization rule is defined so as to maintain high search performance. Preferably, the present invention provides a color quantization method for various levels, thereby enabling to achieve high search performance on maintaining interoperability. The present invention provides a multimedia search method enabling to measure the similarity between features quantized into different levels.

8 Claims, 12 Drawing Sheets

U.S. PATENT DOCUMENTS

| | | |
|---|---|---|
| 6,633,407 B1 | 10/2003 | Kim et al. |
| 6,782,127 B1 | 8/2004 | Lee et al. |
| 6,850,639 B2 | 2/2005 | Song et al. |
| 6,919,971 B2 * | 7/2005 | Lee et al. .................... 358/1.9 |
| 2001/0005426 A1 | 6/2001 | Song et al. |
| 2001/0055128 A1 | 12/2001 | Lee et al. |
| 2002/0059206 A1 | 5/2002 | Lee et al. |
| 2003/0234931 A1 | 12/2003 | Sano et al. |
| 2005/0089222 A1 | 4/2005 | Lee et al. |
| 2005/0094873 A1 | 5/2005 | Lee et al. |
| 2005/0094876 A1 | 5/2005 | Lee et al. |
| 2005/0180630 A1 | 8/2005 | Lee et al. |

FOREIGN PATENT DOCUMENTS

| | | |
|---|---|---|
| EP | 0 953 941 A2 | 11/1999 |
| EP | 1113394 | 7/2001 |
| EP | 1176804 | 1/2002 |
| EP | 1517540 | 3/2005 |
| JP | 10160573 * | 6/1998 |
| JP | 02002027227 | 1/2002 |
| WO | WO 00/02111 | 1/2000 |
| WO | WO 00/76291 | 12/2000 |

OTHER PUBLICATIONS

Zijun Yang et al: "Survey On Image Content Analysis, Indexing, and Retrieval Techniques and Status Report of MPEG-7", *Tamkang Journal of Science and Engineering*, Online Document, vol. 2, No. 3, 1999, pp. 101-118.

Zhang Lei et al: "A CBIR method based on color-spatial feature", Tencon 99. Proceedings of the IEEE Region 10 Conference Cheju Island, South Korea, Sep. 15-17, 1999, Piscataway, NJ, USA, IEEE vol. 1, Sep. 15, 1999, pp. 166-169.

Xia Wan et al. "Color Distribution Analysis and Quantization for Image Retrieval," Proceedings of SPIE; Storage and Retrieval for Still Image and Video Databases IV, vol. 2670, Mar. 1996, San Jose, CA pp. 8-16.

\* cited by examiner

FIG. 11

|  | conventional linear quantization | present invention |
|---|---|---|
| 32 level |  | 0.133983 |
| 64 level | 0.122193 | 0.082306 |
| 120 level |  | 0.060953 |
| 184 level |  | 0.060956 |

FIG. 12

| reference image level | target image level | result |
|---|---|---|
| 184 | 120 | 0.063277 |
| 184 | 64 | 0.085529 |
| 120 | 184 | 0.062502 |
| 120 | 64 | 0.085862 |
| 64 | 184 | 0.081473 |
| 64 | 120 | 0.087782 |

FIG. 17

|  | conventional linear quantization | present invention |
|---|---|---|
| 32 level |  | 0.106949 |
| 64 level | 0.122193 | 0.053468 |
| 128 level |  | 0.041422 |
| 256 level |  | 0.034877 |

FIG. 18

| reference image level | target image level | result |
|---|---|---|
| 256 | 128 | 0.042040 |
| 256 | 64 | 0.053656 |
| 128 | 256 | 0.040127 |
| 128 | 64 | 0.053833 |
| 64 | 256 | NO RESULTS AVAILABLE |
| 64 | 128 | 0.053662 |

COLOR QUANTIZATION AND METHOD THEREOF AND SEARCHING METHOD USING THE SAME

This application is a Continuation of prior application Ser. No. 10/994,402, filed Nov. 23, 2004, which in turn is a Continuation of prior application Ser. No. 09/865,459, filed May 29, 2001 now U.S. Pat. No. 6,919,971, which are hereby incorporated by reference.

BACKGROUND OF THE INVENTION

1. Field of the Invention

The present invention relates to a color quantization and more particularly, color quantization and method thereof based on hue, max, min, difference (HMMD) color space and a searching method using the same in extracting color features whether or not such features are quantized at same levels or different levels.

2. Description of the Related Art

There are new technologies for searching multimedia based on information. Search engines generally use global and local color information and texture information for image search, and color information plays an important role in image search. As more effective color features are being developed, effective color spaces are needed for such a search.

Color information includes various feature information such as color histogram, local representative color and the like. Accordingly, the search performance greatly depends how to quantize the colors. However, it is not possible to express infinite number of color class when the distribution of color classes is represented on a color space and color quantization is required for representing a color information with the limited number of colors (color classes) by combining similar color groups into a single color label.

For instance, in the case of a color histogram in a RGB color space, each element(R,G,B) in a RGB is represented by a numerical character which ranges from 0 to 255. Thus, color classes amount to $256^3$ when we consider only integer numbers, which is unrealistic to be represented by color histograms constituted with $256^3$ bins. Therefore, a single color label is given to consider similar colors one color by grouping them. For the color labeling, a color space is divided into spatial regions amounting to the number of colors to be represented, in which the division method is called a color quantization method.

There are many factors influencing search performance for a multimedia search using colors. First, it is important for a color space to represent colors well. Second, it is important how to divide the given color space because color features of data can be represented or incorrectly depending on the color quantization method. Thus, the color quantization method needs to be proper for high performance search capability.

Further, the related art quantization method does not allow comparison of color information based on different quantization methods or having different quantization levels. All the related arts do not consider the above since the searching is carried on local data bases. Specifically, the comparative search on the color information are based on quantization which is achieved by the same quantization method.

Due to the explosion of internet development and usage, there is a demand for data searching regardless of different data management servers. Therefore, important are functions enabling to compare and search multimedia data reciprocally regardless of the locations and servers of the data. To meet the demands, the proper quantization method should be considered as well as search algorithms for reciprocal comparison, i.e., interoperability, should be provided.

SUMMARY OF THE INVENTION

An object of the invention is to solve at least the above problems and/or disadvantages and to provide at least the advantages described hereinafter.

An object of the present invention is to provide a universally usable quantization method for different quantization levels.

Another object of the present invention is to allow interoperability of different quantization levels.

A further object of the present invention is to provide a color quantization method based on HMMD color space in extracting color features.

Another object of the present invention is to provide a multimedia searching method to search data which are quantized based on different levels.

To achieve these and other advantages, and in accordance with the purpose of the present invention as embodied and broadly described, the color quantization method based on an HMMD color space includes dividing the color space by lines passing though at least one preset diff value, equally dividing a sum axis of a lowest diff region among the divided regions of the color space by 'N' (N is a natural number) regardless of hue, and equally dividing the sum axes, and hue axes of the rest of the divided regions by constants given for the sum axes and the hue axes, respectively. Preferably, the diff values for dividing the color space centering around the diff axis are determined such that small width is designated to low chroma (low diff region), and vice versa. Further, the equal division of the sum axis is based on a longer sum axis of two sum axes of the divided region, and the respective regions are divided into N equal parts from a red color, namely 0°, based on the hue axis.

In another aspect, a color quantization method based on an HMMD color space in an image search system using color information in the HMMD color space according to the present invention includes dividing the color space first based on at least one designated diff value, and dividing the respective divided regions into $2^x$ equal parts based on a sum axis and $2^y$ equal parts based on a hue axis wherein x and y are integer.

In a further aspect, a color quantization method based on an HMMD color space in an image search system using color information in the HMMD color space so as to maintain interoperability between features produced by color quantization for different levels includes (a) dividing the color space into a reference quantization level by carrying out a color quantization of the reference quantization level using diff, sum, and hue, and carrying out another color quantization of a larger number of levels by subdividing at least one of the respective spatial regions having been divided by the color quantization of step (a) based on at least one combination out of diff, sum, hue, min, and max axes.

In a further aspect, a color quantization method based on an HMMD color space in an image search system using color information in the HMMD color space according to the present invention includes (a) dividing the color space into a reference quantization level by carrying out a color quantization of the reference quantization level using diff, sum, and hue, and carrying out another color quantization of a smaller number of levels by merging at least one of the respective regions having been divided by the color quantization of step (a).

In another further aspect, a multimedia searching method using color features quantized by a different-level color quantization method includes (a) mapping meanings of color labels of two features produced by different quantization methods by mapping the color label of the feature produced by the quantization method for a larger number of levels to one of the color labels produced by the quantization method for a smaller number of levels, measuring similarity using the mapped color label, and outputting multimedia data based on the measured similarity.

Preferably, the mapped color label of step (a) is determined if provided that an arbitrary point at the corresponding spatial regions of the color label produced by the quantization method for a larger number of (quantization) levels is included in one of the respective regions corresponding to the color labels produced by the quantization method for a smaller number of (quantization) levels to be mapped.

The color label mapping of step (a) is executed at a time point initiating to compare the similarity of two initial data, wherein a mapping relation of the color labels according to the two quantization methods is stored as a table for and the like, and wherein the stored relation table information is used for following data without further execution of another color label mapping.

A further object of the present invention is to provide a color quantization method based on an HMMD color space and a multimedia searching method using the same, in which a quantization method is optimized to be proper for various quantization levels so as to increase search performance in an HMMD color space.

Another object of the present invention is to provide a color quantization method based on an HMMD color space and a multimedia searching method using the same, in which interoperability between color features quantized into different quantization levels is provided so as to search multimedia generated from different application programs and in which a quantization rule is defined so as to maintain high search performance.

Another object of the present invention is to provide a color quantization method for various levels, thereby enabling to achieve high search performance on maintaining interoperability.

Another object of the present invention is to provide a multimedia search method enabling a measurement of the similarity between features quantized into different levels. Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 11 shows search performance by the respective quantization levels according to a preferred embodiment of the present invention;

FIG. 12 shows interoperability search performance according to a preferred embodiment of the present invention;

FIG. 17 shows search performance by the respective quantization levels according to another preferred embodiment of the present invention; and FIG. 18 shows interoperability search performance according to another preferred embodiment of the present invention.

DESCRIPTION OF THE PREFERRED EMBODIMENTS

In the present invention, it is intended that an HMMD color space, which has an excellent interoperable property and is good for search, is quantized to be fit for image search most effectively.

First, the basics for explaining the preferred embodiment of the present invention are summarized as follows.

(a) Color Quantization Level or Number

The number of colors represented by an arbitrary color space is infinite.

The number of colors represented in a computer by an RGB color space of 256 dimensions amounts to $256^3$ (16777216).

In order to reduce the number of colors represented for searching multimedia based on colors, color labels are allocated by grouping the represented colors into N of a natural number. In this case, the number of color groups is called a color quantization number.

(b) Interoperability

Information is changed in accordance with the quantization method even though color features of multimedia are extracted using the same color space. It is desirable to measure the similarity between two images using image features which are quantized based on different quantization levels. However, the meanings of the color labels represented in the features are different as well as their relationship need to be known.

For example, one color histogram comprises 32 bins by quantizing one data into 32 levels, while another histogram comprises 64 bins by quantizing the other data into 64 levels. For measuring the similarity between the color histograms, there needs to be a correspondence between bins of the first histogram and the bins of the second histogram. However, if the quantization carried out by an arbitrary method, it is very difficult to define the relationship or correspondence of the bins or the relationship may be unknown.

However, if the quantization is based on some rules, it is able to describe the relation of the color labels represented by two features in spite of the application of different quantization levels. Thus, the comparison of similarity is possible. For example, if the space quantized into 32 levels is divided into pair of separate spaces so as to provide 64 levels, the respective bins represented by 64 levels are able to calculate the inclusive relation with ease so as to be mapped into one of the 32 levels. Such a property for enabling the comparison despite the different quantization methods is interoperability.

(c) HMMD Color Space

The HMMD color space is described in U.S. application Ser. No. 09/239,773 filed Apr. 29, 1999 entitled "HMMD Color Space and Method for quantizing Color Using HMMD Space and Color Spreading" by the same inventors of the present invention and assigned to the same entity. The U.S. application claims priority to Korean Application Nos. 15326/1998 and 19401/1998 filed Apr. 29, 1998 and May 28, 1998, respectively. The entire disclosure of the U.S. application and the Korean applications is incorporated herein by reference.

Figure 1:
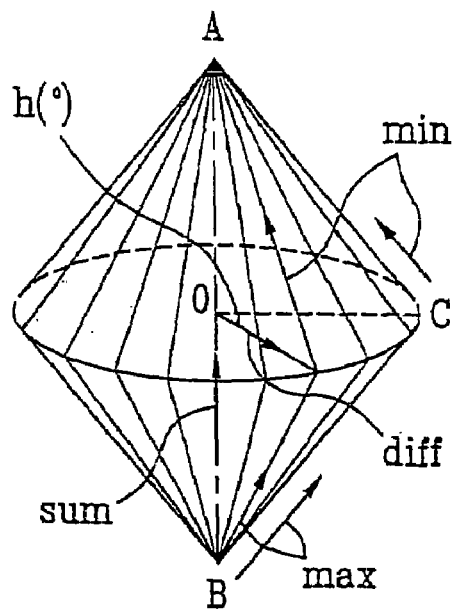
FIG. 1 shows a structure of a HMMD color space according to a preferred embodiment of the present invention.

The HMMD color space has a shape of a pair of double cones with bottoms overlapping face to face, and contains 5 parameters, as illustrated in FIG. 1. The 5 parameters comprises hue, max, min, diff (differential value), and sum, which corresponds to hue, shade, tint, chroma, and brightness or lightness, respectively.

Figure 2:
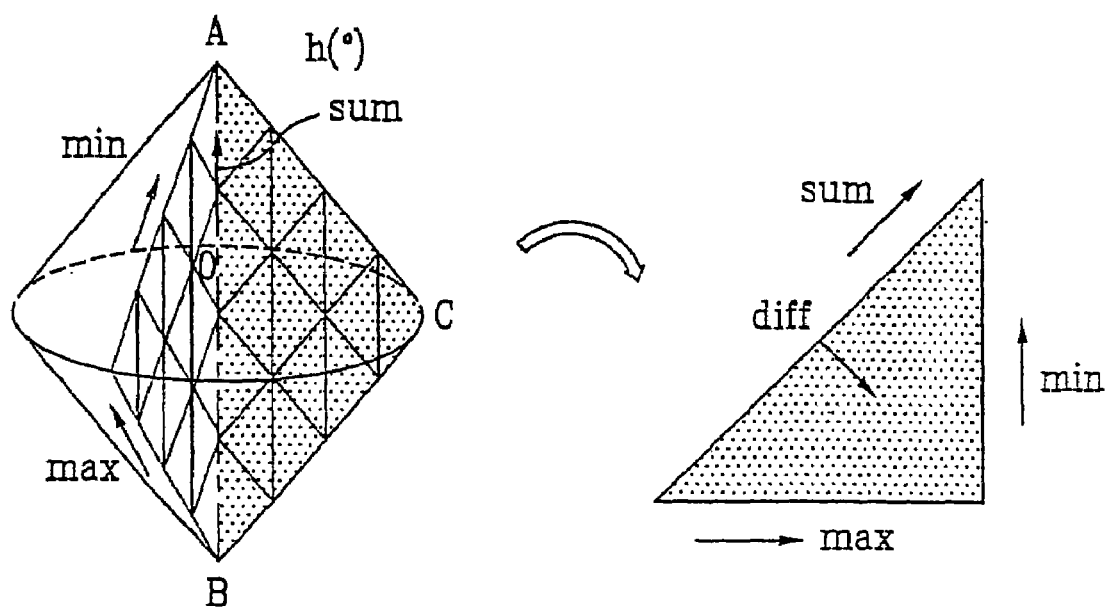
FIG. 2 shows a cross-sectional view of the structure of the HMMD color space of FIG. 1.

FIG. 2 shows an internal cross-sectional view of the structure of the HMMD color space of FIG. 1. A vertical axis connecting two confronting vertexes A and B of the symmetrical cones is 'sum'. A varying value by rotating 0° to 360° along a circumference to a perpendicular direction of the vertical axis is 'hue'. A shortest straight line segment from a center O to a maximum circumference C is 'diff'. A shortest straight line segment from the vertex B of a lower cone to the maximum circumference C is 'max'. The shortest straight line segment from the maximum circumference C to the vertex A of an upper cone is 'min'.

The 5 parameters, hue, max, min, diff, and sum are attained from 3 parameters, r, g, and b of an RGB color space as follows with hue varying from 0 to 360.

$$max=max(r,g,b)$$

$$min=min(r,g,b)$$

$$diff=max(r,g,b)-min(r,g,b)$$

$$sum=(max(r,g,b)-min(r,g,b))/2$$

if max(r,g,b)=min(r,g,b)

hue=UNDEFINED;
else if r=max(r,g,b) & (g-b 0) hue=(g-b)*60/(max (r,g,b)-min(r,g,b));
else if r=max(r,g,b) & (g-b<0) hue=360+(g-b)*60/(max(r,g,b)-min(r,g,b));
else if g=max hue=120+(b-r)*60/(max(r,g,b)-min(r,g,b));
else hue=240+(r-g)*60/(max(r,g,b)-min(r,g,b));
where max(r,g,b) returns the maximum value of r,g,b & min(r,g,b) returns the minimum value of r,g,b.

Figure 3:
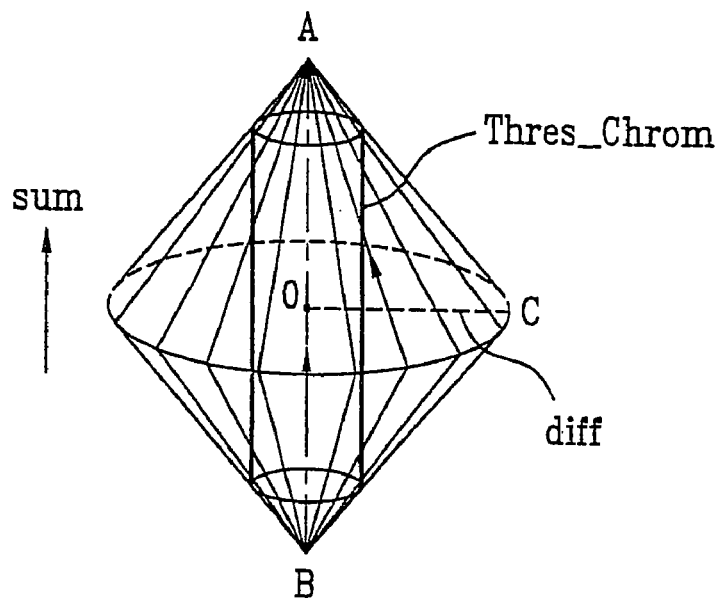
FIG. 3 shows a state of dividing a gray region in a HMMD color space.

FIG. 3 shows a state of dividing a gray region in a HMMD color space, where the HMMD color space is first divided based on diff. A region having a diff value under a predetermined critical value (Thres_Chrom), is a gray region of which color is unable to be discerned by hue, as illustrated in FIG. 3. As brightness works only for discerning colors belonging to the gray region, this region is divided based on sum corresponding to brightness.

Figure 4:
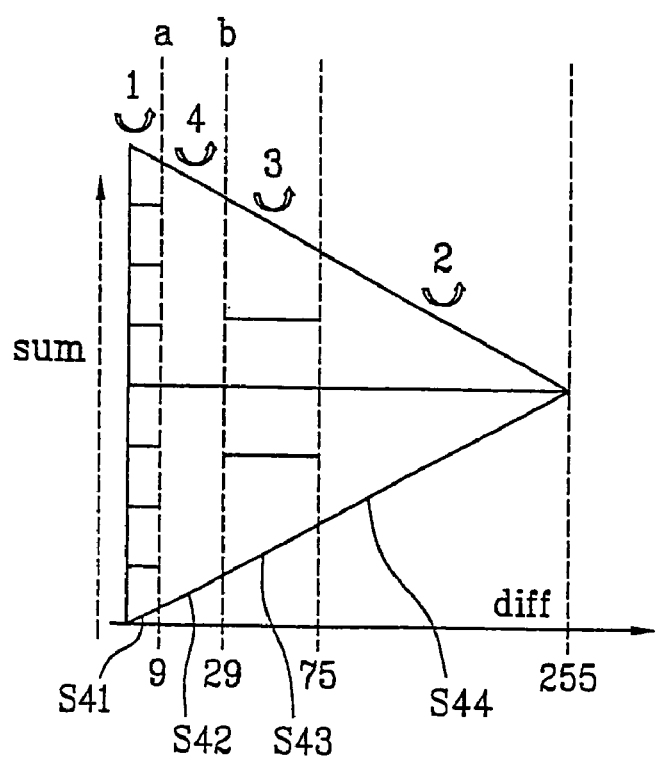
FIG. 4 shows an MMD cross-sectional view of an HMMD color space in a 32-level quantization method according to a preferred embodiment of the present invention.

FIG. 4 shows an MMD cross-sectional view of an HMMD color space based on 32 quantization levels according to a preferred embodiment of the present invention. When a diff value lies between 0 and 255, the color space is divided into four spatial regions based on diff values of 9, 29, and 75, the spatial regions are designated by S41, S42, S43, and S44, respectively.

In this case, as shown in FIG. 3, the spatial region S41 has the lowest diff value, i.e., the gray region where the chroma is the lowest. Thus, the spatial region S41 is divided into 8 equal parts based on brightness, i.e., divided based on the sum axis instead of the hue axis. The spatial region S42 is divided into 4 equal parts based on hue axis, and each of the 4 equal parts is divided into 2 equal parts based on sum axis. The spatial region S43 is divided into 3 equal parts based on hue axis, and each of the 3 equal parts is divided into 4 equal parts based on sum axis. The spatial region S44 is divided into 2 equal parts repeatedly based on hue and sum, respectively.

In the spatial regions S42, S43 and S44, the HMMD color space is divided into equal parts based on hue axis, and then, the other division into equal parts is carried out based on sum axis, and vice versa. Namely, in the spatial regions S42, S43 and S44, the divisions are carried out in random order. This relation is applied to all the divisions of arbitrary regions based on sum axis and hue axis.

A wider sum width "a" rather than a narrower width "b" in both end sum widths in the divided regions is taken when based on sum axis, which is also applied to the divisions into equal parts by the given constants in the regions divided by the diff values when based on sum axis. In a region having a less chroma, i.e. a low diff value is divided by diff, the division by diff, as shown in the drawing, results in narrow regions. Thus, discerning capability by colors is effectively enforced because most of pixel colors constituting data are concentrated on a chroma region having a less middle value in accordance with the data characteristics.

To the same effect, when quantization is carried out with the small number such as 32 levels, the division by hue is carried out more finely compared to that of a high chroma region so as to divide a low chroma region into smaller spatial regions. Therefore, the regions are effectively represented by using a color of less level.

Figure 5:
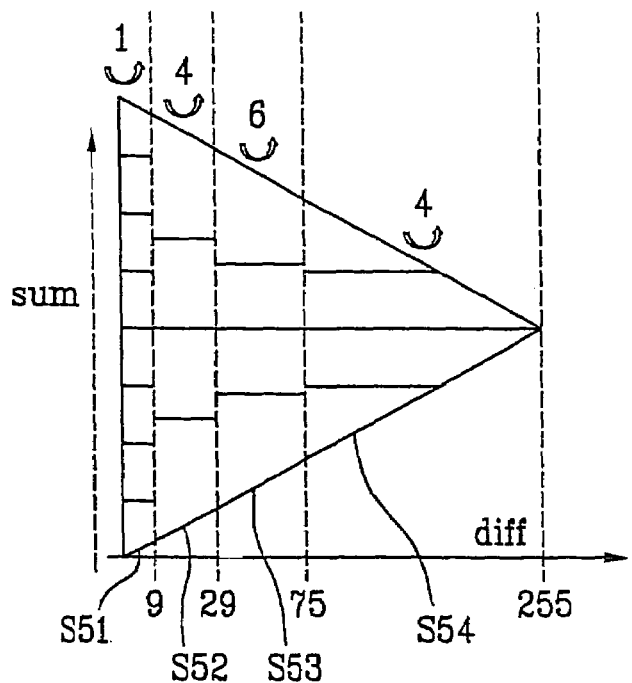
FIG. 5 shows an MMD cross-sectional view of an HMMD color space in a 64-level quantization method according to a preferred embodiment of the present invention.

FIG. 5 shows an MMD cross-sectional view of an HMMD color space in a 64-level quantization method according to a preferred embodiment of the present invention. The color space is divided into four spatial regions based on diff values of 9, 29, and 75 in a diff axis, and the spatial regions are designated by S51, S52, S53, and S54, respectively.

Based on FIG. 3, spatial region S51 has the lowest diff value, i.e., the gray region of which chroma is the lowest. Thus, the spatial region S51 is divided into 8 equal parts based on brightness, i.e., divided based on sum axis instead of hue axis. The spatial region S52 is divided into 4 equal parts based on hue and 4 equal parts based on sum axis. The spatial region S53 is divided into 6 equal parts based on hue axis and 4 equal parts based on sum axis. The spatial region S54 is divided into 4 equal parts repeatedly based on hue and sum axis respectively.

Based on such common rules, one of the sixty-four divided regions of FIG. 5 is completely included in one of the thirty-two divided regions of FIG. 4. Preferably, the divisional boundaries of the thirty-two divided regions coincide with the sixty-four divided regions. When the similarity between data represented by 32-level divided color of FIG. 4 and the data represented by 64-level divided color of FIG. 5 is measured, color labels of small levels are used for the consistency despite using different color labels. Thus, the color information of 64 quantization levels can be transformed into the color information of 32 quantization levels.

The measurement of data similarity differs in accordance with the characteristics of the color information, which is applied to image search using color histograms as color information in the preferred embodiment of the present invention. A color histogram is an information corresponding to the color distribution through an entire image pixels.

To determine the color histogram, the color values of the respective pixels in an image belonging to certain divided spaces are calculated when an HMMD color space is divided by the given quantization method. Then, the distributions are recorded in the histogram bins having the corresponding color labels of the respective divided spaces.

The method of searching an image using such color histograms is carried out by measuring the similarity between a color histogram of a reference image and another color histogram of a target image. In this case, the similarity is attained by the following formula 1.

$$\sum_{i=0}^{i=n} |(Hr[i] - Ht[i]|$$ (Formula 1)

n: the number of bins of histogram

Hr[i]: ith bin value of a histogram of a reference image

Ht[i]: ith bin value of a histogram of a target image

The respective bin values of the histogram representing a general distribution are fractions.

In order to reduce the storage space of a histogram, the fractional values are quantized to be represented by a space under one byte (8 bits) instead of using all the four bytes (32 bits) which are generally used for representing the fraction.

In the preferred embodiment of the present invention, the respective fractional values are represented by 8 bits, i.e. 1 byte, for which a fractional value is quantized into 0 to 255 values.

Figure 6:
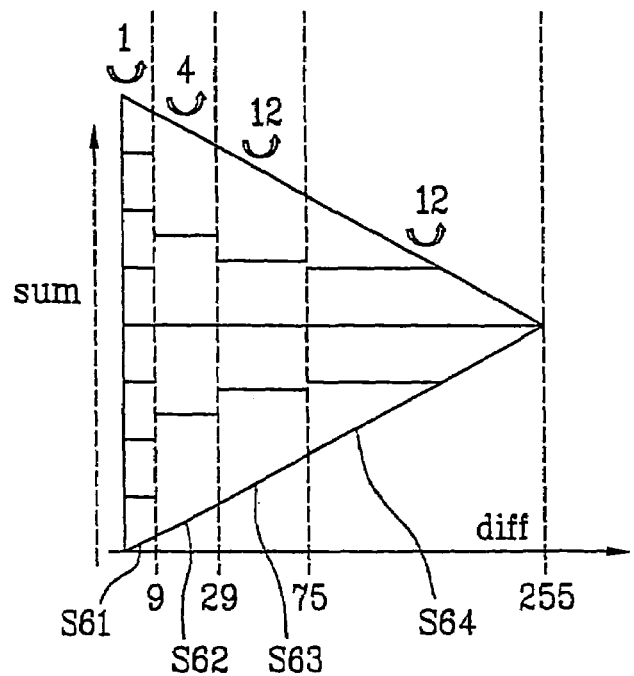
FIG. 6 shows an MMD cross-sectional view of an HMMD color space in a 120-level quantization method according to a preferred embodiment of the present invention.

FIG. 6 shows an MMD cross-sectional view of an HMMD color space based on 120 quantization levels method according to a preferred embodiment of the present invention. The color space is divided into four spatial regions based on diff values of 9, 29, and 75 in a diff axis, and the spatial regions are designated by S61, S62, S63, and S64, respectively.

Based on FIG. 3, spatial region S61 is the region having the lowest diff value, i.e., the gray region where chroma is the lowest. Thus, the spatial region S61 is divided into 8 equal parts based on brightness, i.e., divided based on sum axis instead of hue axis. Spatial region S62 is divided into 4 equal parts based on hue axis, and divided again into 4 equal parts based on sum axis. Spatial region S63 is divided into 12 equal parts based on hue axis, and divided again into 4 equal parts based on sum axis. Spatial region S64 is divided into 12 equal parts based on hue axis, and divided again into 4 equal parts based on sum axis. Based on such a division, the 120 divided regions are completely included in one of the 64 divided regions of FIG. 5. Preferably, the color space comprises division of dividing all the divided regions corresponding to S53 in the divided regions into two equal parts respectively based on hue axis and by dividing all the divided regions corresponding to S54 into 3 equal parts respectively based on hue axis. In other words, spatial region S63 corresponds to additional division of spatial region S53 by two equal parts based on hue axis, and spatial region S64 correspond to additional division of spatial region S54 by three equal parts based on hue axis.

Figure 7:
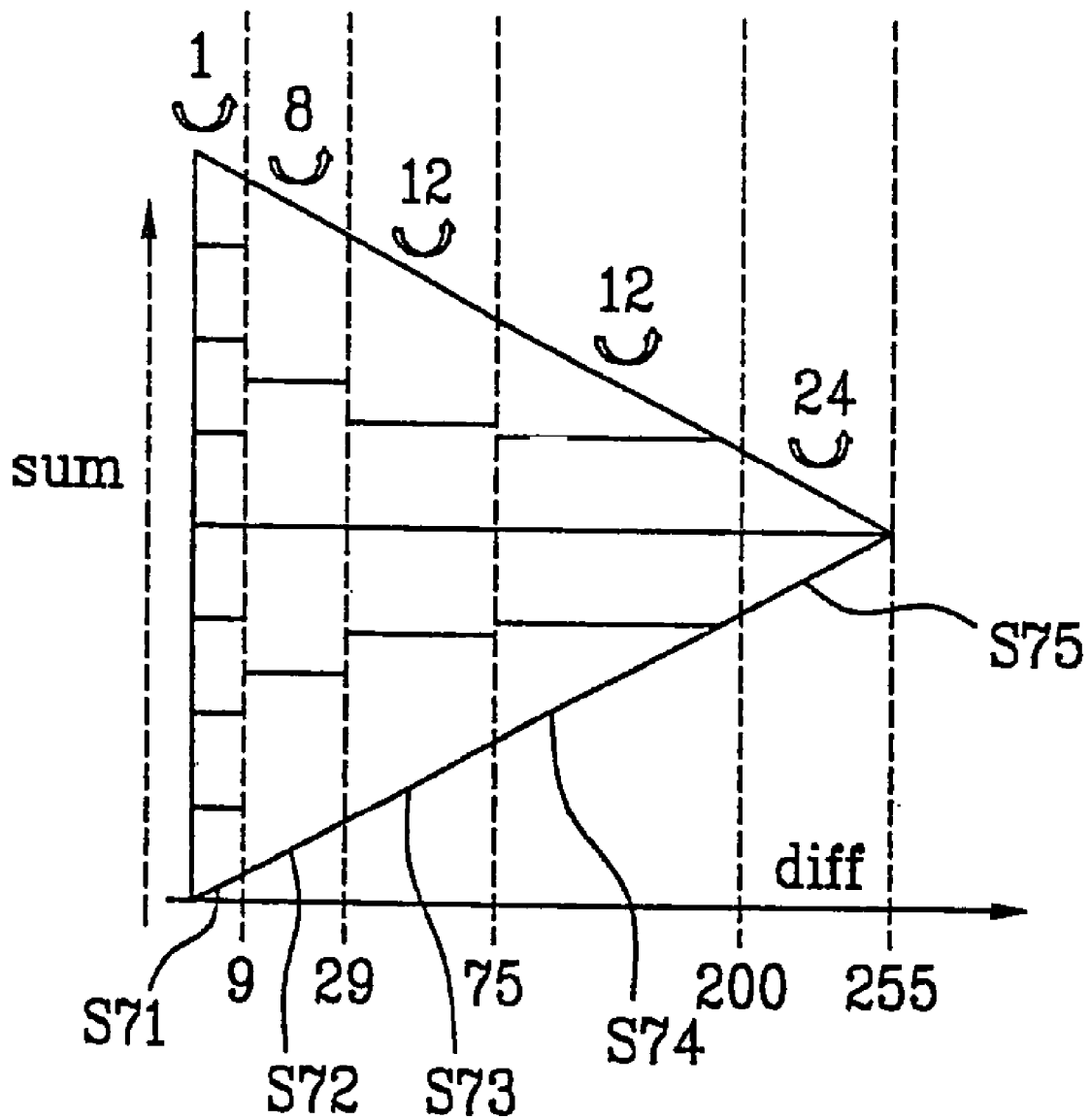
FIG. 7 shows an MMD cross-sectional view of an HMMD color space in a 184-level quantization method according to a preferred embodiment of the present invention.

FIG. 7 shows an MMD cross-sectional view of an HMMD color space based on 184 quantization levels according to a preferred embodiment of the present invention. The color space is divided into five spatial regions based on diff values of 9, 29, 75, and 200 in a diff axis, and, the spatial regions are designated by S71, S72, S73, S74, and S75 respectively.

Based on FIG. 3, spatial region S71 is the region having the lowest diff value, i.e., the gray region where chroma is the lowest. Thus, the spatial region S71 is divided into 8 equal parts based on brightness, i.e., divided based on sum axis instead of hue axis. Spatial region S72 is divided into 8 equal parts based on hue axis, and divided again into 4 equal parts based on sum axis. Spatial region S73 is divided into 12 equal parts based on hue axis, and divided again into 4 equal parts based on sum axis. Spatial region S74 is divided into 12 equal parts based on hue axis, and divided again into 4 equal parts based on sum axis. Spatial region S75 is divided into 24 equal parts based on hue axis, and divided again into 2 equal parts based on sum axis. Based on such a division, the 184 divided regions of FIG. 7 are completely included in one of the 120 divided regions of FIG. 6.

Figure 8:
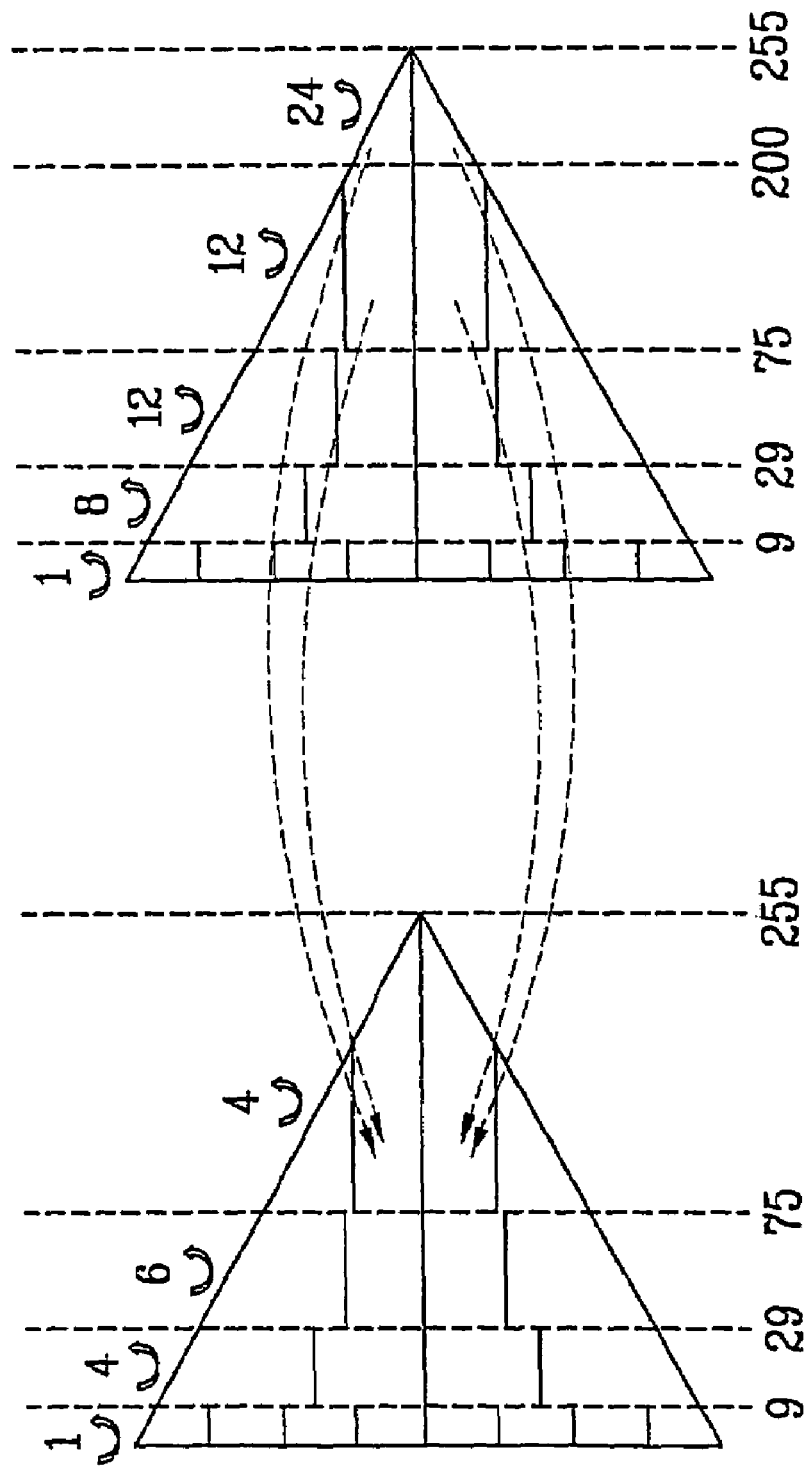
FIG. 8 shows MMD cross-sectional views in HMMD color spaces for illustrating a color label mapping relation between 184 and 64 levels.

FIG. 8 shows MMD cross-sectional views in HMMD color spaces for illustrating a color label mapping relationship between 184 and 64 levels, wherein the finely-divided regions of 184 levels are mapped directly into a roughly-divided regions of 64 levels. A mapping method transforms a color label of a color information, which is quantized into a larger level in color information quantized by different quantization methods, into another color label of another color information quantized into a smaller number of levels. If two or more color levels transformed have same level, the sum of values of the color levels is compared with the value of the corresponding color level in a smaller number of levels. For this transformation, after a new color label is obtained by using a low level quantizing method, a color label of one point in the divided region of color information quantized to a high level is found in the obtained color label, and transformed into the obtained color label.

In another method, color mapping is carried out by mapping a quantized color label from a larger level to a smaller number of levels. An arbitrary point in the respective regions quantized into large levels has to be included in one of the other regions quantized into small levels. Therefore, mapping is completed in a manner that the arbitrary point is transformed into the level of the corresponding inclusive region.

Figure 9:
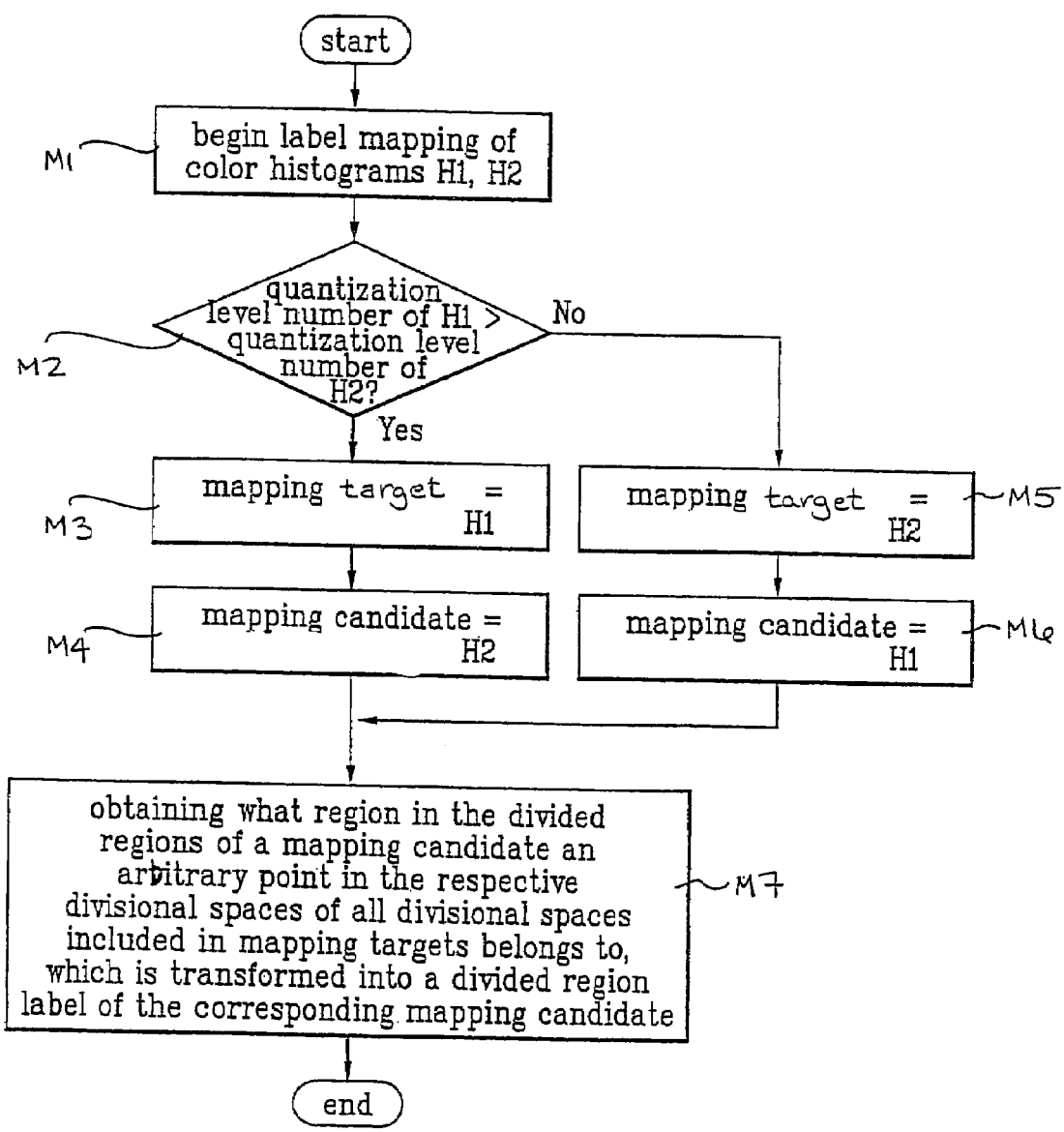
FIG. 9 is a flowchart for the execution sequence of a color mapping method according to a preferred embodiment of the present invention.

Such a mapping process is illustrated by a flowchart in FIG. 9.

To compare two histograms (H1, H2) extracted by different level of color quantization method, the number of bins in each histogram is compared (M2) after mapping of the histograms H1 and H2 (M1). If the number of bin in histogram H1 is bigger than that of histogram H2, histogram H1 is set as a mapping target (M3) and histogram H2 is set as a mapping candidate (M4). Otherwise, histogram H2 is set as a mapping target (M5) and histogram Hi is set as a mapping candidate (M6).

Next, all the labels of each bin in mapping target is changed higher into the corresponding labels of bins in mapping candidate by the following way: Suppose sub-regions or spatial regions in the color space dived by color-quantization method used for mapping target is Set A and sub-regions divided by color-quantization method used for mapping candidate is Set B. Within all the sub-regions in Set A, change the label of sub-region in Set A into the label of the sub-region in Set B if the sub-region in Set B includes the arbitrary point of the sub-region in Set A (M7). Finally, complete the mapping process by sum values of bins if their labels are the same (M7).

Having the merit of fast mapping and transformation of color labels, the first-described method is used when two different quantization formulae are known. On the other hand, when the quantization formulae are not known but the information of divided regions in a color space is known, the second-described method may be used.

It is unnecessary for the color mapping to be executed on every comparison of two data. When a similar data is generally searched in a specific data base by referring to a specific data, a color information may be extracted using the same quantization method in one database. Thus, if the color information quantization method for a reference data is different from that of a data belonging to the data base, the above-described color mapping is applied once. After the relation between two color labels is stored in a table during the first mapping process, the mapping is directly executed using the relation stored in the table. Hence, it is able to reduce the time taken for the color mapping.

Figure 10A:
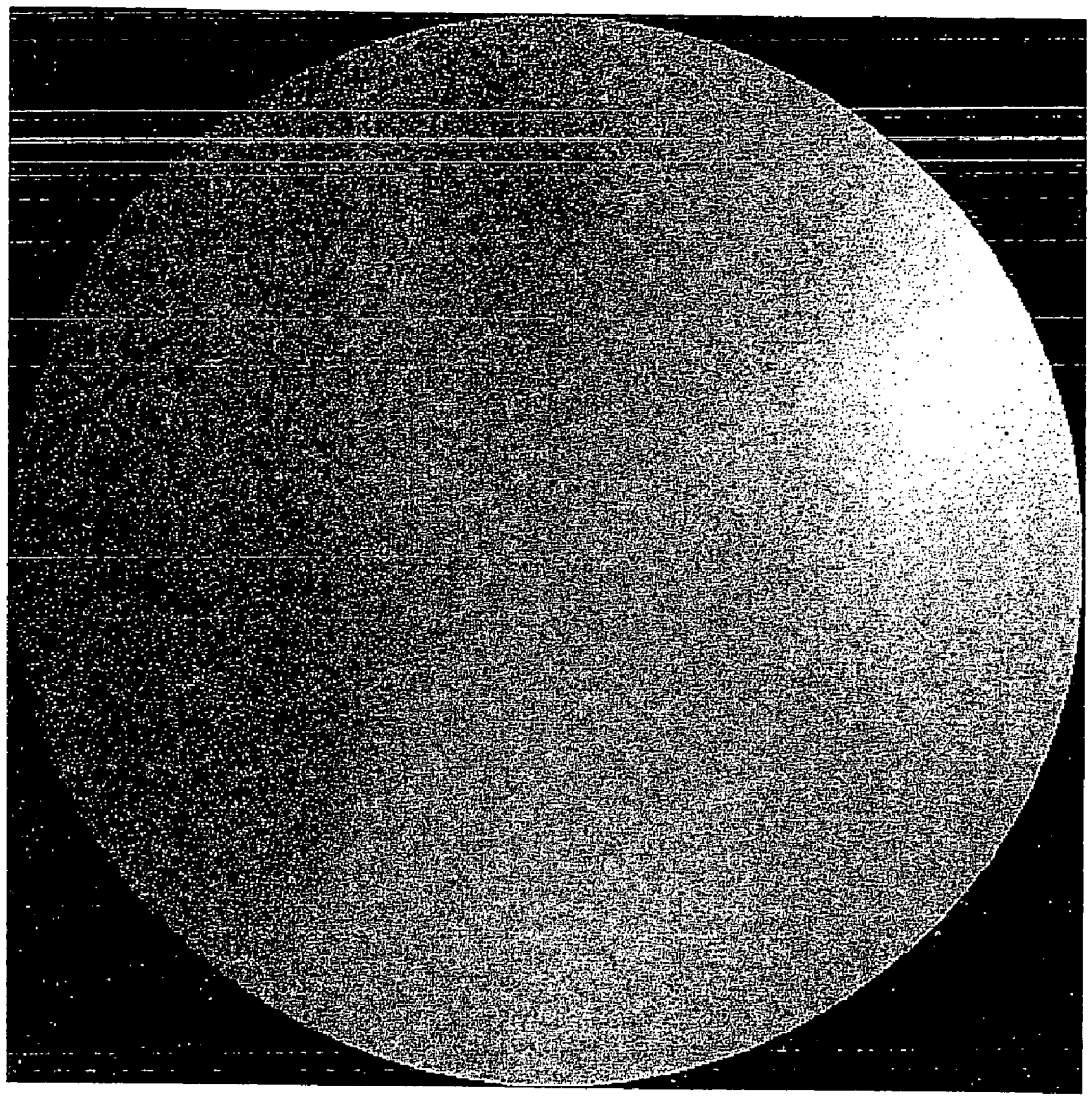
FIG. 10A shows a cross-sectional view of a HMMD color space based on hue according to a preferred embodiment of the present invention.
Figure 10B:
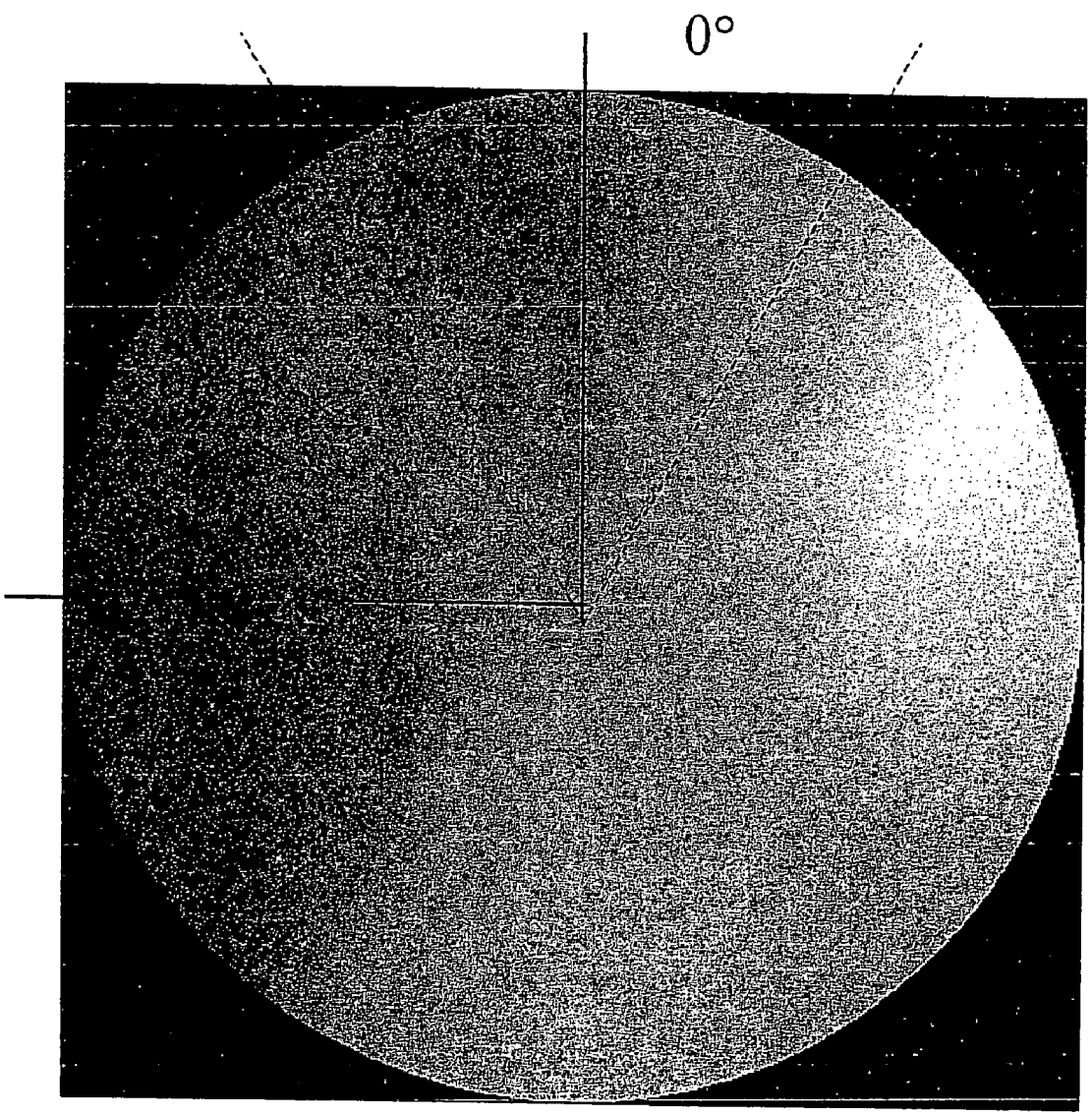
FIG. 10B shows a quantization process based on hue axis according to a preferred embodiment of the present invention.

FIG. 10A shows a cross-sectional view of a HMMD color space based on hue axis, and FIG. 10B shows a quantization process based on hue axis wherein the division is processed on a hue plane based on 0°. Referring to FIG. 10A and FIG. 10B, an interval between −45° and +45° shown by dotted line may be visually regarded as a proper red region. However, it is advantageous that an interval between 0° and 90° shown by solid line is divided as one region when search is going on.

In data characteristics, a dark color of red series is widely used to represent a shade region of one object area. In this case, the red color is applied uniformly to a combination of either red/green components or red/blue components in a data. Namely, it is very uncommon that a dark color is represented in a data by both combinations of the red and green components and the red and blue components, which is caused by the characteristics of multimedia data encoding or image acquisition apparatuses.

FIG. 11 shows a table of the error rate result of searching images using the respective quantization methods according to the preferred embodiment of the present invention. The smaller search error rate, i.e., closer to '0', the higher the search result becomes. As shown in the table, compared to a conventional linear quantization method, the present invention provides excellent search performance which becomes higher by the increase of level number. For example, in the 64 level, the conventional linear quantization has an error rate of 0.122193 (12.2193%) compared to error rate of 0.082306 (8.2306%).

FIG. 12 shows a table of search error rate result by calculating the similarity between features extracted with different quantization levels using the respective quantization methods according to the first embodiment of the present invention. The high search performance (low error rate) indicates the interoperability between different quantization levels. Hence, when the data quantized into different levels are searched, the search performance of the lowest level quantization is guaranteed at least by the interoperability.

Although the search performance has to be equal to the search result of the low level in a reference image level and a target image level, little difference occurs practically during operation due to hardware and the like. For instance, when the reference image level and the target image level are attained by being quantized into 120 and 64 levels respectively, the search performance or error rate should have resulted in 64 levels as shown in FIG. 11, i.e., 8.2306%. However, the search performance result of FIG. 12 is quite close, i.e., 8.5862%.

In the first embodiment of the present invention, the diff values used for color quantization and the adjunctive pre-determined constants dividing the respective regions are preselect values which provide the best search performance. However, such constants can be changed based on need. When images color-quantized by the different quantization methods are searched, the reference color quantization level and the other color quantization level used subsequently to divide more minutely the quantized color regions are attained by using the preselected values. Hence, the result of the present invention allows high search performance at all times, thereby enabling to search all existing multimedia data regardless of time and place.

In another embodiment of the present invention, diff values are introduced to represent color quantization levels by $2^x$ such as 256, 128, 64, and 32. Then, spatial regions are divided based on the levels so that search can be processed in the different quantization levels respectively.

In an image search system using color information in an HMMD color space, a color quantization method based on an HMMD color space according to another embodiment of the present invention includes dividing the color space first based on at least one predetermined diff value when a differential value diff lies between 0 and 255, and dividing diff regions into $2^x$ equal parts based on sum axis and $2^y$ equal parts based on hue axis wherein x and y are integer.

In another embodiment of the present invention, when diff is represented by the number between 0 and 255, diff values are established as 6, 20, 60, and 110 to divide the color space along a diff axis. Then, the color space is divided into 5 spatial regions based on the diff values. And, it is assumed that the divided spatial regions are S1, S2, S3, S4, and S5 respectively. The respective divides regions S1, S2, S3, S4, and S5 are divided into $2^x$ equal parts based on sum axis and $2^y$ equal parts based on hue axis, thereby dividing the color space region into various regions having various levels.

In this case, if the regions S1, S2, S3, S4, and S5 divided along the diff axis are equal and are further divided into predetermined number, which satisfies positive numbers of exponents to 2 i.e. $2^x$ and $2^y$, equal parts, it is always possible to search by transforming the region into one of 256/128/64/32 level quantizations.

Figure 13:
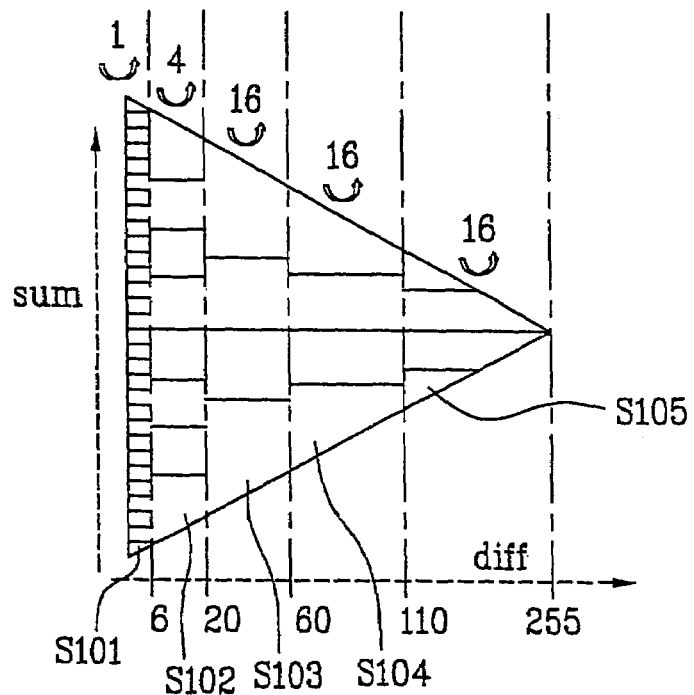
FIG. 13 shows an MMD cross-sectional view of an HMMD color space in a 256-level quantization method according to another preferred embodiment of the present invention.

FIG. 13 shows an MMD cross-sectional view of an HMMD color space in a 256-level quantization method according to another embodiment of the present invention. The color space is first divided into five spatial regions based on diff values of 6, 20, 60, and 110 when a color quantization level to be divided is 256, which correspond to the spatial regions designated by S101, S102, S103, S104, and S105 respectively. The spatial regions S101 to S105 are divided into equal parts based on sum and hue axes to satisfy positive numbers of exponents to 2 respectively.

The region S101 is divided into 32 equal parts based on the sum axis, thereby providing 32 spatial regions. Spatial region S102 is divided into 8 ($2^3$) equal parts based on the sum axis and again into 4 ($2^2$) equal parts based on the hue axis, thereby being divided into 32 spatial regions. Spatial region S103 is divided into 4 ($2^2$) equal parts based on the sum axis and again into 16 ($2^4$) equal parts based on the hue axis, thereby being divided into 64 spatial regions. Spatial region S104 is divided into 4 ($2^2$) equal parts based on the sum axis and again into 16 ($2^4$) equal parts based on the hue axis, thereby being divided into 64 spatial regions. Spatial region S105 is divided into 4 ($2^2$) equal parts based on the sum axis and again into 16 ($2^4$) equal parts based on the hue axis, thereby being divided into 64 spatial regions. Accordingly, the color space is divided into 256 spatial regions, i.e., 256 levels.

Figure 14:
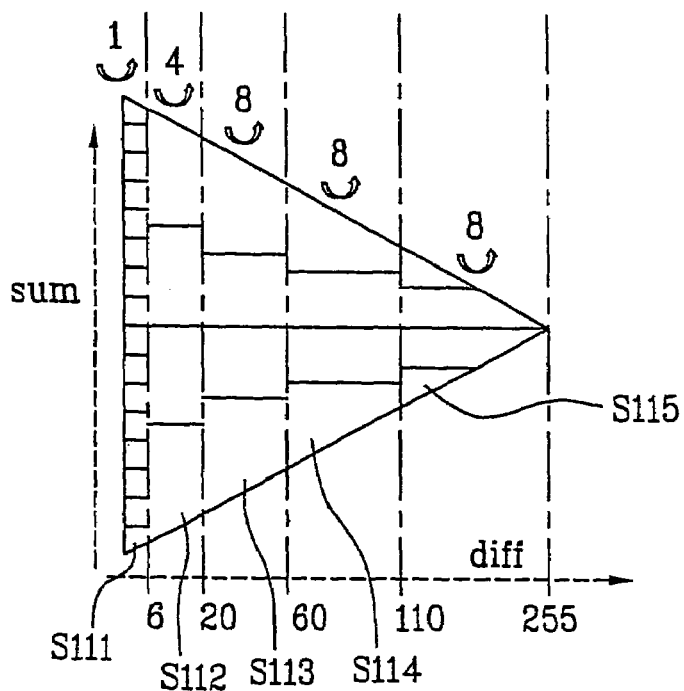
FIG. 14 shows an MMD cross-sectional view of an HMMD color space in a 128-level quantization method according to another preferred embodiment of the present invention.

FIG. 14 shows an MMD cross-sectional view of an HMMD color space in a 128-level quantization method according to another embodiment of the present invention. The color space is first divided into five spatial regions based on diff values of 6, 20, 60, and 110 when a color quantization level to be divided is 128, corresponding to the spatial regions designated by S111, S112, S113, S114, and S115 respectively. The spatial regions S111 to S115 are divided into equal parts based on sum and hue axes to satisfy positive numbers of exponents to 2 respectively.

The region S111 is divided into 16 equal parts based on the sum axis, thereby providing 16 spatial regions. Spatial region S112 is divided into 4 equal parts based on the sum axis and again into 4 equal parts based on the hue axis, thereby being divided into 16 spatial regions. Spatial region S113 is divided into 4 equal parts based on the sum axis and again into 8 equal parts based on the hue axis, thereby being divided into 32 spatial regions. Spatial region S114 is divided into 4 equal parts based on the sum axis and again into 8 equal parts based on the hue axis, thereby being divided into 32 spatial regions. Spatial region S115 is divided into 4 equal parts based on the sum axis and again into 8 equal parts based on the hue axis, thereby being divided into 32 spatial regions. Accordingly, the color space is divided into 128 spatial regions.

Figure 15:
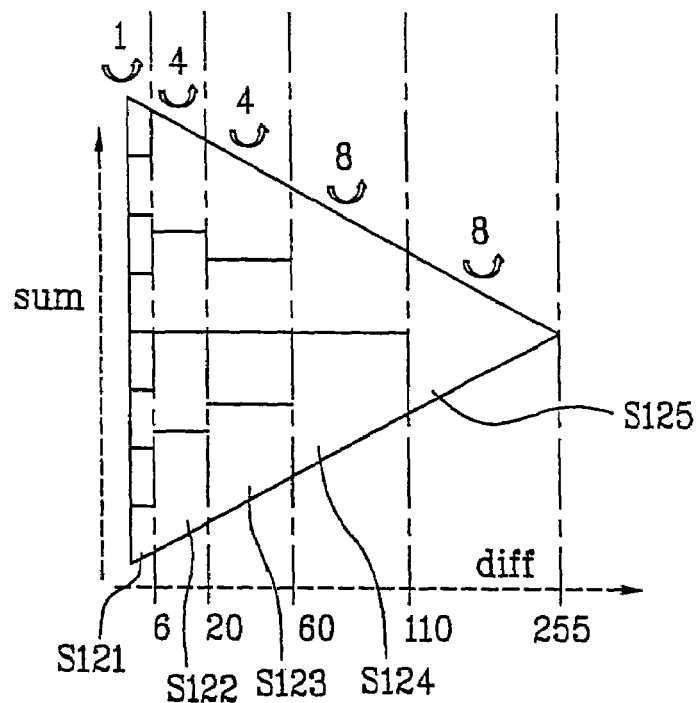
FIG. 15 shows an MMD cross-sectional view of an HMMD color space in a 64-level quantization method according to another preferred embodiment of the present invention.

FIG. 15 shows an MMD cross-sectional view of an HMMD color space in a 64-level quantization method according to another embodiment of the present invention. The color space is first divided into five spatial regions based on diff values of 6, 20, 60, and 110 when a color quantization level to be divided is 64, which corresponds to the spatial regions designated by S121, S122, S123, S124, and S125 respectively. The spatial regions S121 to S125 are divided into equal parts based on sum and hue axes to satisfy positive numbers of exponents to 2 respectively.

The region S121 is divided into 8 equal parts based on the sum axis, thereby providing 8 spatial regions. Spatial region S122 is divided into 4 equal parts based on the sum axis and again into 4 equal parts based on the hue axis, thereby being divided into 16 spatial regions. Spatial region S123 is divided into 4 equal parts based on the sum axis and again into 4 equal parts based on the hue axis, thereby being divided into 16 spatial regions. Spatial region S124 is divided into 2 equal parts based on the sum axis and again into 8 equal parts based on the hue axis, thereby being divided into 16 spatial regions. Spatial region S125 is divided into 8 equal parts based on the hue axis, thereby being divided into 8 spatial regions. Accordingly, the color space is divided into 64 spatial regions.

Figure 16:
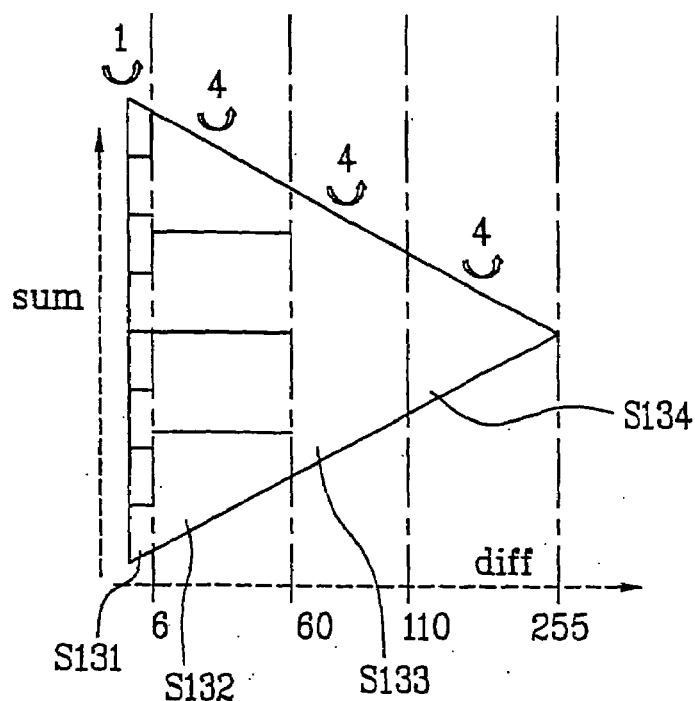
FIG. 16 shows an MMD cross-sectional view of an HMMD color space in a 32-level quantization method according to another preferred embodiment of the present invention.

FIG. 16 shows an MMD cross-sectional view of an HMMD color space in a 32-level quantization levels according to another embodiment of the present invention. The color space is first divided into five spatial regions based on diff values of 6, 60 and 110 in a diff axis when a color quantization level to be divided is 32, which correspond to the spatial regions designated by S131, S132, S133, and S134 respectively. The spatial regions S131 to S134 are divided into equal parts based on sum and hue axes to satisfy positive numbers of exponents to 2 respectively.

The region S131 is divided into 8 equal parts based on the sum axis, thereby providing 8 spatial regions. Region S132 is divided into 4 equal parts based on the sum axis and again into 4 equal parts based on the hue axis, thereby being divided into 16 spatial regions. Region S133 is divided into 4 equal parts based on the hue axis, thereby being divided into 4 spatial regions. Region S134 is divided into 4 equal parts based on the hue axis, thereby being divided into 4 spatial regions. Accordingly, the color space is divided into 32 spatial regions, i.e. 32 levels.

As described in the foregoing explanation, the region, which has the lowest diff value, i.e., the gray region, where chroma is the lowest, is not divided based on the hue axis. The division is carried out based on brightness, i.e., divided based on sum axis.

FIG. 17 shows a table of the error rate result of searching images using the respective quantization methods according to the preferred embodiment of the present invention. FIG. 18 shows a table of error rate search result by calculating the similarity between features extracted with different quantization levels using the respective quantization methods according to the preferred embodiment of the present invention. In the preferred embodiment of the present invention, the diff values used for color quantization and the adjunctive predetermined constants of exponents to 2 dividing the respective regions are preselected values which indicates the best search performance.

Preferably, the color quantization is first processed by carrying out a color quantization for a reference level. Thereafter, another color quantization for a larger level is carried out by subdividing the respective spatial regions having been color-quantized into more minute regions, or other color quantization for a smaller level is carried out by combining the respective spatial regions having been color-quantized.

For example, based on a reference quantization level as 32, the subdivision is carried out on the divided regions generated from the quantization in accordance with the level order from 64, 128, and 256 subsequently. On the other hand, based on a reference quantization level as 256, the division is carried out on the divided regions generated from the quantization more finely in accordance with the level order from 128, 64, and 32 subsequently.

The former case of quantizing the spatial regions, which have been quantized by a reference level, into a larger level by subdivision includes dividing the color space into a reference level by carrying out a color quantization of the reference level using diff, sum, and hue, and carrying out another color quantization of a larger level by subdividing at least one of the respective spatial regions having been divided by the color quantization of the first step based on at least one combination out of diff, sum, hue, min, and max.

In this case, the reference of the color quantization level is 32, the diff values designated for dividing the color space into the reference level are 6, 60, and 110 respectively when a differential value diff ranges 0 to 255, and the color space is first divided into 4 spatial regions by the diff values. If the spatial regions are S131, S132, S133, and S134, the regions S131 to S134 are divided into positive numbers of exponents to 2 equal parts based on sum and hue axes, thereby dividing the color space into the reference level of 32.

The process of dividing the spatial regions S131 to S134 into 32 level is the same as that of another embodiment for the 32-level quantization method. In the process of carrying out the color quantization for a larger level from 32 to 64 levels, after the region S132 has been divided again into two spatial regions S132-1 and S132-2 based on the diff value of 20, the spatial regions S132-1 and S132-2 are divided into 4 equal parts based on the sum axis while the quadruply-divided hue axis remains as it is. Thus, the region S132 is divided into 32 spatial regions. The region S131 having been divided into 8 equal parts in 32-level based on the sum axis is untouched.

The region S133 is divided into 2 equal parts based on the sum axis and the respective divided regions are subdivided into 8 equal parts based on the hue axis, thereby being divided into 16 spatial regions. Preferably, the region S133 was divided into 4 equal parts in 32-level but is divided into 8 equal parts in 64-level. The region S134, which has been divided into 4 equal parts in 32-level based on the hue axis, is divided into 8 equal parts, thereby being divided into 8 spatial regions. Thus, the color space is divided into 64 levels from 32.

In the process of carrying out the color quantization for a larger level from 64 to 128 level based on the above conversion from 32 to 64 level, the region S131, which has been divided into 8 equal parts in 64-level, is divided into 16 equal parts based on the sum axis, thereby being subdivided into 16 spatial regions.

The region S132-1, which has been divided into 4 equal parts based on the sum axis and 4 equal parts based on the hue axis in 64-level, is maintained. The region S132-2 maintains the state that has been divided into 4 equal parts in 64-level based on the sum axis and is divided into 8 equal parts instead of 4 equal parts in 64-level based on the hue axis, thereby being subdivided into 32 spatial regions.

The region S133 maintains the state that has been divided into 8 equal parts based on the hue axis and is divided into 4 equal parts instead of 2 equal parts in 64-level based on the sum axis, thereby being subdivided into 32 spatial regions. The region S134 maintains the state that has been divided into 8 equal parts based on the hue axis and is divided into 4 equal parts based on the sum axis, thereby being subdivided into 32 spatial regions. Accordingly, the color space is divided into 128 levels from 64.

In the process of carrying out the color quantization for a larger level from 128 to 256 levels based on the conversion of 32 level, the region S131, which has been divided into 16 equal parts in 128-level, is divided into 32 equal parts based on the sum axis, thereby being subdivided into 32 spatial regions. The region S132-1 maintains the state that has been divided into 4 equal parts based on the hue axis and is divided into 8 equal parts instead of 4 equal parts in 128-level based on the sum axis, thereby being subdivided into 32 spatial regions. The region S132-2 maintains the state that has been divided into 4 equal parts based on the sum axis and is divided into 16 equal parts instead of 8 equal parts in 128-level based on the hue axis, thereby being subdivided into 64 spatial regions.

The region S133 maintain the state that has been divided into 4 equal parts based on the sum axis and is divided into 16 equal parts instead of 8 equal parts in 128-level based on the hue axis, thereby being subdivided into 64 spatial regions. The region S134 maintains the state that has been divided into 4 equal parts based on the sum axis and is divided into 16 equal parts instead of 8 equal parts in 128-level based on the hue axis, thereby being subdivided into 64 spatial regions. Accordingly, the color space is divided into 256 levels from 128.

On the other hand, the latter case of quantizing the spatial regions, which have been quantized by a reference level, into a smaller level by mergence includes dividing the color space into a reference level by carrying out a color quantization of the reference level using diff, sum, and hue, and carrying out another color quantization of a smaller level by merging at least one of the respective spatial regions having been divided by the color quantization of the previous step.

In this case, the reference of the color quantization level is 256, the diff values designated for dividing the color space into the reference level are 6, 20, 60, and 110 respectively when a differential value diff ranges 0 to 255, and the color space is first divided into 5 spatial regions by the diff values, which correspond to the spatial regions are S101, S102, S103, S104, and S105. Then, the regions S101 to S105 are divided into positive numbers of exponents to 2 equal parts based on sum and hue axes, thereby dividing the color space into the reference level of 256. The process of dividing the spatial regions S101 to S105 into 256 levels is the same as the quantization method of 256 levels described in another embodiment of the present invention.

In the process of carrying out the color quantization for a smaller level from 256 to 128 levels, the region S101 is divided into 16 equal parts instead of 32 equal parts in 256-level based on the sum axis, whereby the quantization level of the region S101 is reduced to 16 levels. The region S102 maintains the state that has been divided into 4 equal parts in 256-level based on the hue axis and is divided into 4 equal parts instead of 8 equal parts in 256-level based on the sum axis, whereby the quantization level of the region S102 is reduced to 16 levels.

The region S103 maintains the state that has been divided into 4 equal parts in 256-level based on the sum axis and is divided into 8 equal parts instead of 16 equal parts in 256-level based on the hue axis, whereby the quantization level of the region S103 is reduced to 32 levels. The region S104 maintains the state that has been divided into 4 equal parts in 256-level based on the sum axis and is divided into 8 equal parts instead of 16 equal parts in 256-level based on the sum axis, whereby the quantization level of the region S104 is reduced to 32 levels.

The region S105 maintains the state that has been divided into 4 equal parts in 256-level based on the sum axis and is divided into 8 equal parts instead of 16 equal parts in 256-level based on the hue axis, whereby the quantization level of the region S105 is reduced to 32 levels. Accordingly, the color space is divided into 128 levels from 256.

In the process of carrying out the color quantization for a smaller level from 128 to 64 levels with reference to the previous conversion of 256 to 128 levels, the region S101 is divided into 8 equal parts instead of 16 equal parts in 128-level based on the sum axis, whereby the quantization level of the region S101 is reduced to 8 levels. The region S102 maintains the state that has been divided into 4 equal parts based on the sum axis and 4 equal parts based on the hue axis.

The region S103 maintains the state that has been divided into 4 equal parts based on the sum axis and is divided into 4 equal parts instead of 8 equal parts in 128-level based on the hue axis, whereby the quantization level of the region S103 is reduced to 16 levels. The region S104 maintains the state that has been divided into 8 equal parts based on the hue axis and is divided into 2 equal parts instead of 4 equal parts in 128-level based on the sum axis, whereby the quantization level of the region S104 is reduced to 16 levels.

The region S105 maintains the state that has been divided into 8 equal parts based on the hue axis and is divided into 1 equal part instead of 4 equal parts in 128-level based on the sum axis, whereby the quantization level of the region S105 is reduced to 8 levels. Accordingly, the color space is divided into 64 levels from 128.

In the process of carrying out the color quantization for a smaller level from 64 to 32 levels with reference to the previous conversion, the region S101 maintains the state that has been divided into 8 equal parts in 64-level based on the sum axis. The region S102 and the region S103 are merged, and the merged region maintains the state that has been divided into 4 equal parts based on the hue axis and is divided into 4 equal parts based on the sum axis, whereby the quantization level of the merged region is reduced to 16 levels.

The region S104 maintains the state that has been divided into 1 equal part instead of 2 equal parts in 64-level based on the sum axis and is divided into 4 equal part instead of 8 equal parts in 64-level based on the hue axis, whereby the quantization level of the region S104 is reduced to 4 levels. The region S105 maintains the state that has been divided into 1 equal part based on the sum axis and is divided into 4 equal parts instead of 8 equal parts in 64-level based on the hue axis, whereby the quantization level of the region S105 is reduced to 4 levels. Accordingly, the color space is divided into 32 levels from 64.

In the latter preferred embodiment of the present invention, expandability and search performance are more improved compared to the previous preferred embodiment by having the HMMD color space area which is quantized into a quantization level expressed by $2^x$ to be used for search. As mentioned in the above description, the present invention for multimedia searches such as an image search and the like uses an HMMD color space proper for the search in order to use the most important color information effectively, and particularly enables high search performance in spite of the quantization using small-numbered color levels.

Accordingly, the present invention provides high search performance by standardizing the most optimum color quantization method through the search-related standardization such as MPEG-7 as well as by using less space of features which is required for the search. Moreover, the present invention enables to provide a multimedia search method based on colors which corresponds with the true standardization and a solution to settle the feature structures by providing a quantization method which guarantees the interoperability enabling to compare and search reciprocally regardless of the different quantization methods applied to various uses.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures

What is claimed is:

1. A color quantization method based on a color space comprising a plurality of axes, the method comprising:
    dividing the color space into a plurality of subspaces along a first axis; and
    quantizing each of the plurality of subspaces by dividing each said subspace into at least one sub-region along a second axis and a third axis, wherein a number of sub-regions divided along the second axis and third axis is determined by a number of quantization levels.

2. The method of claim 1, wherein the color space comprises HMMD color space.

3. The method of claim 2, wherein the first axis comprises a differential axis, the second axis comprises a sum axis and the third axis comprises a hue axis.

4. The method of claim 3, wherein the number of quantization levels comprises one of 32, 64, 128, and 256 levels.

5. The method of claim 4, wherein if the number of quantization levels comprises 32, the color space is divided into 4 subspaces, wherein:
    in subspace 0, the number of sub-regions is 8;
    in subspace 1, the number of sub-regions is 16;
    in subspace 2, the number of sub-regions is 4; and
    in subspace 3, the number of sub-regions is 4.

6. The method of claim 4, wherein if the number of quantization levels comprises 64, the color space is divided into 5 subspaces, wherein:
    in subspace 0, the number of sub-regions is 8;
    in subspace 1, the number of sub-regions is 16;
    in subspace 2, the number of sub-regions is 16;
    in subspace 3, the number of sub-regions is 16; and
    in subspace 4, the number of sub-regions is 8.

7. The method of claim 4, wherein if the number of quantization levels comprises 128, the color space is divided into 5 subspaces, and wherein:
    in subspace 0, the number of sub-regions is 16;
    in subspace 1, the number of sub-regions is 16;
    in subspace 2, the number of sub-regions is 32;
    in subspace 3, the number of sub-regions is 32; and
    in subspace 4, the number of sub-regions is 32.

8. The method of claim 4, wherein if the number of quantization levels comprises 256, the color space is divided into 5 subspaces, and wherein:
    in subspace 0, the number of sub-regions is 32;
    in subspace 1, the number of sub-regions is 32;
    in subspace 2, the number of sub-regions is 64;
    in subspace 3, the number of sub-regions is 64; and
    in subspace 4, the number of sub-regions is 64.

* * * * *